April 2, 1974     E. LANGECKER     3,801,689
METHOD FOR APPLYING LABELS OR PLATES TO HOLLOW BODIES OF
THERMOPLASTIC SYNTHETIC SUBSTANCE PRODUCED BY THE
BLOW MOULDING PROCESS
Original Filed June 1, 1970     6 Sheets-Sheet 5

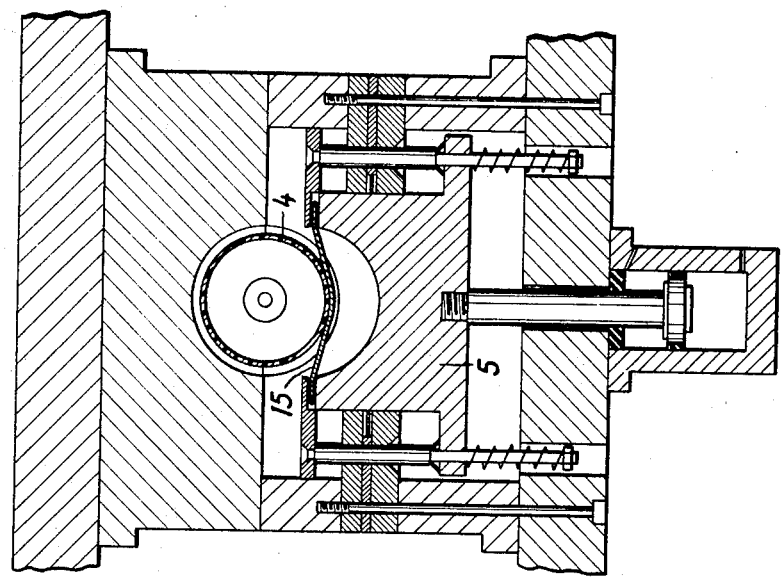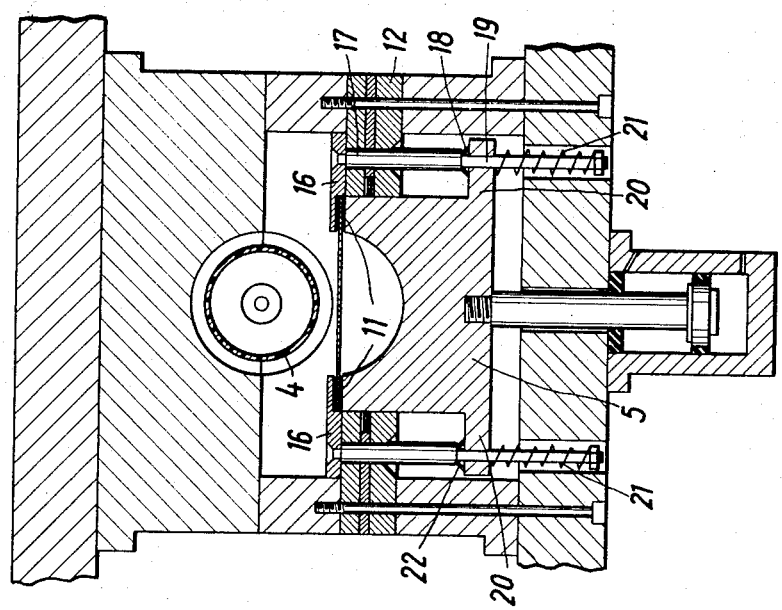

United States Patent Office 3,801,689
Patented Apr. 2, 1974

3,801,689
METHOD FOR APPLYING LABELS OR PLATES TO HOLLOW BODIES OF THERMOPLASTIC SYNTHETIC SUBSTANCE PRODUCED BY THE BLOW MOULDING PROCESS
Erhard Langecker, Hohbuschner Weg 5, Meinerzhagen, Westphalia, Germany
Original application June 1, 1970, Ser. No. 42,064, now Patent No. 3,684,418, dated Aug. 15, 1972. Divided and this application Apr. 13, 1972, Ser. No. 243,887
Claims priority, application Germany, June 12, 1969, P 19 29 983.3
Int. Cl. B29c 17/07, 27/22; B32b 1/10
U.S. Cl. 264—94                                    6 Claims

ABSTRACT OF THE DISCLOSURE

A wrap-round label is applied to a blow-moulded article by means of a plunger extending through the mould wall. The front face of the plunger is concave, being shaped to fit the article, and the label is initially mounted on the plunger so as to be stretched or taut across the front face. When blow-moulding commences, initially the plunger is in an outwardly retracted position. As blow moulding proceeds, the plunger is advanced so as to wrap the label around the article.

---

This is a divisional of copending application Ser. No. 042,064, filed June 1, 1970, now Pat. No. 3,684,418.

The invention relates to a method of applying labels or plates to hollow bodies of thermoplastic synthetic substance produced by a blow moulding process.

It is known to attach a colored and/or printed label of a thin film of weldable or adhesive material inserted into a blow mould during the blow moulding of the hollow body to that hollow body where the label is introduced either from the outside through openings in the wall of the blow mould or from the inside through the parting line of the blow mould.

In the case of such attachment of a label or a plate to a hollow body produced by blow moulding there exists an essential problem in that on applying the label to the hollow body the formation of air inclusions between the hollow body and the label have to be avoided as far as possible. For this purpose the surface of the label or plate which comes into contact with the hollow body has been roughened in order to distribute evenly the air which inevitably becomes entrapped between the label and the hollow body in the hollows formed by the roughening and in this way to avoid the formation of spot-like blisters. For the same purpose the labels to be applied have also been produced from tissue or of porous material or even of perforated foils. Even if these films can be applied substantially without the formation of blisters, they have substantial disadvantages which are opposed to their use. These labels to be applied are always provided with pictures and a printed text. In order to prevent damaging the printing by abrasion, transparent films are used which are provided with the printed text on their surface which is to be laid on the surface of the hollow body. In this case the roughening and the use of a tissue or a perforated film is disadvantageous, since the clarity of the printed text is impaired by the roughening which is on the surface. Furthermore, there is the danger that the hollows in the film surface due to the roughening or the use of a tissue becoming filled by the printed ink so that there can occur at the printed large surface places spot-like blisters, since the possibility of a uniform distribution of the air is no longer ensured. The same holds true for perforated films. Also they can detrimentally impair the printed picture; likewise the perforations at the printed places can be closed by the ink so that even here the formation of blisters is not reliably avoided.

Therefore in the interest of a clear reproduction of the text on the labels it is desirable to use films as labels which render possible a faultless and clear application of the text and picture print. In a known or previously proposed method there is displaceably mounted in the opening of the blow mould a plunger the face of which has a curvature corresponding to the curvature of the hollow body. The label to be applied to the hollow body is inserted in any appropriate manner in the plunger, for example by hand or by stamping and is maintained in the correct position on its upper surface, where the plunger upper surface can be provided with suction bores to hold the label firmly. In this way, the operation is carried out in such a manner that during the closing operation of the blow mould the plunger carrying the label is moved in the mould closure position so that on inflation of the parison the label is to be found in its final position in relation to the hollow body. In this known or previously proposed method, when using a label with a smooth surface, blister between the label and the hollow body cannot be avoided, since the air between the label and the hollow body cannot be led off during the inflation of the hollow body. Therefore even with this method it is usually necessary to use the disadvantageous roughened or perforated films.

The object of the invention is to make possible a blister-free application of a label with a smooth surface into a hollow body at an angle of embrace of about 60 to 180° and thus permits the implementation of the advantages given by the smooth film.

This is effected in accordance with the invention in that the label with its edges lying in the direction of the axis of the hollow body is held flexibly in a stretched position on the surafce of a plunger which is adapted to the shape of the hollow body and in that the plunger is in resilient position in relation to the mould wall during the inflation and is advanced directly before the end of the inflation from its resilient position into a mould closure position corresponding to the finished hollow body, where the label envelops the hollow body and the air which is between the label and the parison is led off via the parting line of the mould. The invention resides in the realization that a blister-free application of a label to a hollow body is ensured only when on contact of the hollow body with the label the latter comes to ret firstly in the region of its center on the label so that between label and hollow body there are formed on both sides of the center interstices which enlarge in a wedge-shaped manner and which are made to disappear by the movement of the plunger into the mould surface with gradual diminution, where the label arrives at complete blister-free emplacement on the hollow body, since the air in the interstices is led outwardly by force. In order to render possible a blister-free application with an angle of embrace of the label of about 60 to 180°, it is necessary in accordane with the realization of the invention not to arrange and hold the label on the face of the plunger adapted to the hollow body, but to attach the label in a stretched position on the surface of the plunger. The advancement movement of the plunger takes place when the inflation of the parison is almost finished, so that the label in the stretched position lies against the lower apex of the parison and then on further advancement movement is gradually wrapped around the parison in the given angle of embrace; in this conection during the advancement movement of the plunger the air between the parison and the inner side of the label is led out of the bilateral wedge-shaped interstices via the mould parting line, without any air inclusions being able to form between the hollow body and the label in spite of the large angle of embrace.

When on application of a label with a large angle of embrace of this type the operation has to be effected starting from a strip-like film fed into the mould in a rhythmical manner from which the individual labels are to be stamped out by the plunger constructed as a cutting tool, a problem arises insofar that on stamping out the label by the plunger the label is of necessity retracted from its stretched position, which is necessary for the blister-free application, by the cutting edge directed perpendicularly to the longitudinal axis of the hollow body. In such a stamping out from the film the blister-free application with a large angle of embrace is however impossible, since the label, before it comes into contact with the inflated parison, is already in a position of rest on the face of the plunger adapted to the shape of the hollow body. Since a blister-free application is only ensured when the label in stretched position is brought into contact with the inflated parison, the use of a film web offers the above-mentioned difficulties, the surmounting of which is likewise the object of the invention. These difficulties are obviated in accordance with the invention in that when using a film strip passing rhythmically through the mould, a film strip having a width exceeding the width or length of the label is used and in that the peripheral cut of the label perpendicular to the longitudinal axis of the hollow body is effected firstly in the film and after that the peripheral cut of the label lying parallel to the longitudinal axis is effected. By the measure in accordance with the invention of effecting the peripheral cut of the label directed transversely to the longitudinal axis of the hollow body in the film and only then of undertaking the cuts lying in the direction of the longitudinal axis of the hollow body by the plunger moving out of its resilient position it is ensured that the label cut out of the film web remains in the stretched position until, as a result of the upward movement of the plunger, it comes into contact with the almost inflated parison. Only when this measure in accordance with the invention is ensured, is a blister-free application of a label with large angle of embrace using a film web possible.

When using ready cut labels, it is a feature of the invention that the latter when lain in the mould engages at its edges lying in the direction of the longitudinal axis of the hollow body and is deposited on the surface of the plunger. By the engagement of the ready cut label at the edges lying in the direction of the hollow body longitudinal axis it is possible to apply the label in a stretched position onto the upper surface of the plunger and to maintain it in this position until the stretched label, as a result of the upward movement of the plunger, comes into contact with the inflated parison.

The device for carrying out the method is characterized in that the plunger has at its faces adapted to the shape of the hollow body linking surfaces which accommodate the edges of the label lying in the direction of the axis of the hollow body, at said surfaces engaging the devices serving for the flexible holding of the label. The seating of the label on the plunger takes place on the surfaces linked to the rounding of the plunger, said surfaces either lie as horizontal surfaces in one plane and/or can be obliquely conically inclined to each other, where in the case of the latter embodiment of the surfaces the application of the label onto the hollow body is rendered easy. The label is maintained in the stretched position by devices engaging at the seating surfaces and as a result of the flexible holding on applying the label to the hollow body is drawn off from these surfaces, where the edge areas are also joined to the hollow body, when the plunger arrives at its mould closure position.

The devices serving to hold the label on the seating surfaces can consist of perforations opening out in the seating surfaces and fed with vacuum intake air.

When using a strip-like film the device is characterized in that there is provided in the guides of the plunger lying on both sides of the film in the direction of movement a groove formed by a guide strip and cutting strip; said groove corresponding to the width of the foil and being above the cutting edge of the plunger in the resilient position. In this case it is essential that in the plunger guides having the guide groove there are incorporated parallel to the lift direction of the plunger displaceable pins which are each reinforced at the plunger underside by a compression spring or the like; said pins each having at their upper ends a clamping member overlapping the receiving surface of the plunger and that there are secured at the plunger spring elements which on engagement with a collar arranged on the pins limit the clamping effect of the clamping member until the label is withdrawn from the latter and the plunger reaches the mould closure position with the clamping members. On upward movement of the plunger the label is separated from the strip by the cutting edge of the plunger lying in the direction of the longitudinal axis of the hollow body out of the film strip whose cuts are made transversely to the hollow body. In this way the label with edge areas lying along the axis of the hollow body is tensioned and held fast between the seating surfaces of the plunger and the clamping members overlapping these. Directly before the plunger reaches its closure position the spring elements secured to the plunger meet in engagement with the collar of the pin and thus limit the width of the clamping gap so that on further upward movement of the plunger the labels can be withdrawn without damage from the clamping members. Only then, when the plunger has completely reached its closure position is the force of the spring elements overcome so that the clamping members come to sit directly on the seating surface of the plunger and form a gapless blow mould. Instead of the clamping members there can when using a film also be provided perforations which are under vacuum air intake and empty in the seating surfaces of the plunger.

In order to effect the cuts to be made transversely to the hollow body axis there can be arranged on the mould an additional device which effects the necessary cut directed at right angles before it enters the mould, where two cuts following one after the other and directed at right angles must, of course, have a spacing which corresponds to the length or width of the label.

In accordance with a further feature there can also be used a film strip in which the necessary cuts or stampings to be arranged transversely to the hollow body longitudinal axis have already been made.

The shape of the label to be applied to the hollow body is not restricted to a square or perpendicular shape; labels with rounded corners can also be used. Furthermore labels which have an oval or round shape can also be used; in this case the cuts perpendicular and parallel to the longitudinal axis of the hollow body are not rectilinear but correspond to the shape of the label as the case may be. Furthermore the labels can be applied also from both sides onto the hollow body in such a manner that there results a two-part label enveloping the whole hollow body; in this case both parts of the blow mould are provided with a plunger to apply the label. In addition the invention is not restricted to cylindrical hollow bodies; they can also be made conical or ball-shaped.

The invention will be further described by way of examples with reference to the accompanying drawings, in which:

FIG. 3 is a view in accordance with FIG. 2, in which a longitudinal cut of the film strip is made;

FIG. 4 is a view in accordance with FIG. 3 in which the label, held in a stretched position, comes into contact with the almost inflated tube parison;

FIGS. 1 to 8 show devices in accordance with the invention with a film strip, FIGS. 9 to 12 show a device in accordance with the invention with a ready cut label lain in the mould.

Figure 1:
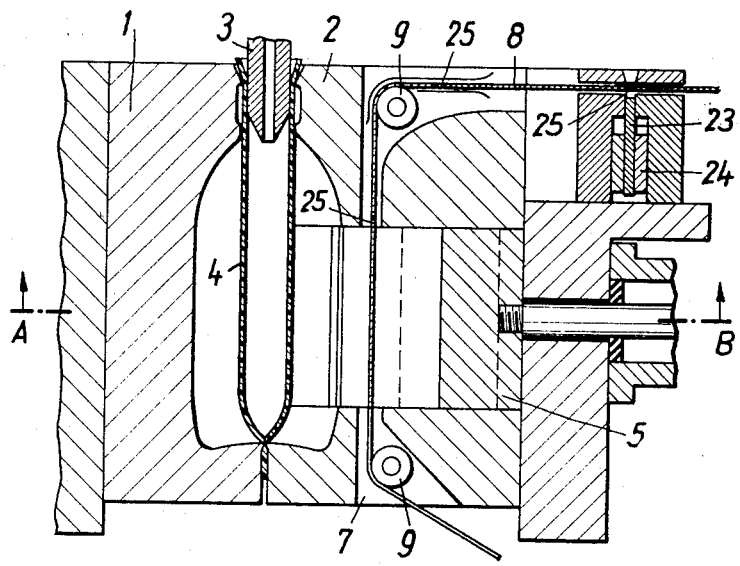
FIG. 1 shows a section through a device in accordance with the invention using a film strip.
Figure 2:
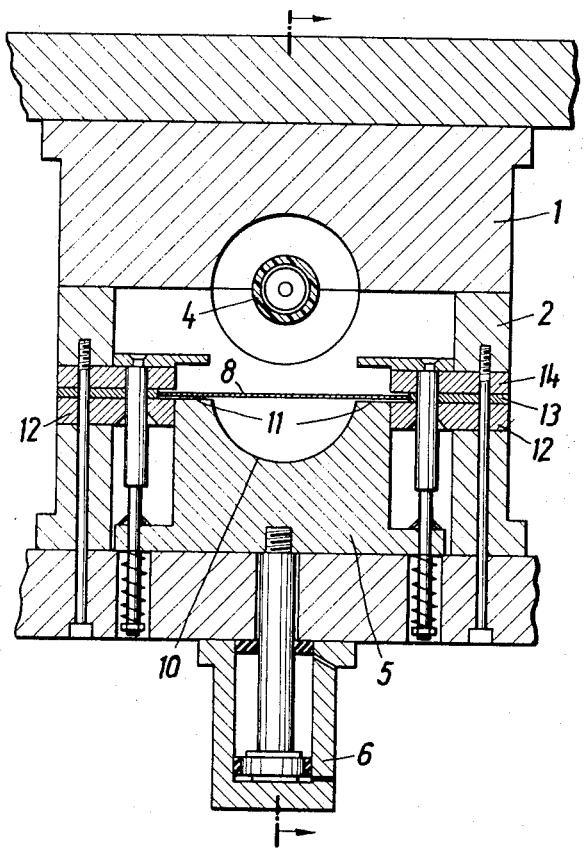
FIG. 2 shows a transverse section along line A–B of FIG. 1 with the film strip.
Figure 5:
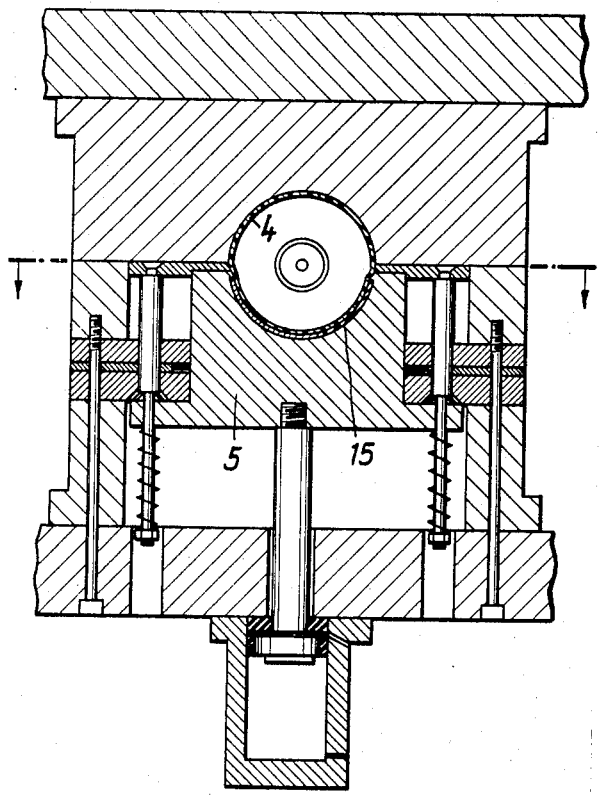
FIG. 5 is a view in accordance with FIG. 2 in which the plunger is in the mould closure position.

FIG. 1 shows one of the devices in section. It consists, in the normal manner, of two mould halves 1 and 2 between which in the closure position there is engaged a blow mandrel 3 which inflates a tube-shaped parison 4 of thermoplastic synthetic material which is taken up in the mould; in the mould half 2 there is arranged a plunger 5 which can be moved from a withdrawn position shown in FIG. 2 by means of a piston-cylinder-arrangement 6 to a mould closure position shown in FIG. 5. The mould half 2 possesses an opening 7, through which strip 8 of a sheet or film of weldable or adhesive material is introduced via rollers 9 into the mould parting line. The plunger 5 possesses a face 10 corresponding to the hollow body, the said face 10 adjoining, on both sides, seating surfaces 11, on which, as FIG. 2 shows, the film strip 8 lies. The width of the label corresponds to the width of the stamping plunger 5 with its seating surfaces. In the mould half 2 there are arranged on both sides guide strips 12 lying in the longitudinal axis of the parison 4; on said guide strips 12 there is arranged a strip 13 which serves as a separator; on said strip 13 lies the cutting strip 14. The film possesses, as FIG. 2 shows, a greater width than the width of the label and is guided on both sides into the groove or channel formed by the strips 12, 13, 14. When, as FIG. 3 shows, the parison 4 is inflated to a certain extent the piston-cylinder-arrangement 6 comes into operation and moves the plunger 5 out of its withdrawn position according to FIG. 2 upwards, as shown in FIGS. 3 to 5. By this means, the label 15 is cut out of the film 8 with the requisite width by the outer edges of the seating surfaces 11 which serve together with the cutting strip 14 as cutting edges. On a further upward movement of the plunger 5, as FIG. 4 shows, the rigidly held label 15 comes into contact with the lower apex of the parison 4 and is gradually during further inflation and during the further upward movement of the plunger 5 brought into the final position shown in FIG. 5; in said position the plunger 5 has reached its mould closure position and the label 15, over its whole length lies at an envelopment of the inflated hollow body at an angle of about 180°.

When, according to FIG. 2, the label is cut out from the film strip 8 the seating surfaces 11 of the plunger 5 bearing the label 15 (FIG. 3) in a taut or stretched condition come into contact with clamping members 16 which overlap the seating surfaces 11 of the plunger 5 and engage the label 15 at its edges lying in the direction of the axis of the hollow body 4. The clamping effect between the members 16 and the seating surfaces 11 is attained by the clamping members 16 being secured to pins 17 which are arranged in the strips 12, 13, 14 in an upward displaceable manner. The pins are of reduced width over their lower regions 19, forming collars 18. The regions 19 extend through the side flanges 20 of the plunger 5 and carry on their ends compression springs 21 which are compressed between the end of the region 19 and the under side of the flanges 20. Below each collar 18 there is secured to the upper side of the flange 20 a plate spring 22. The mode of operation of the pins 17 is as follows. When, according to FIG. 3, the label 15 is cut out of the film strip 8 the plunger moves upward and comes into engagement with the clamping members 16 which are taken by the plunger with it on its further upward movement according to FIG. 4. In this way the springs 21 become tensioned and exert a holding pressure on the clamping members 16, whereby the limitation of the clamping gap is effected by the plate springs 22. In this way the label, held at its edges by the clamping members, is so flexibly tensioned that on upward movement of the plunger 5 into the mould closure position, as FIGS. 4 and 5 show, the label is drawn out of the gaps of the clamping members 16 so that it lies completely on the surface of the parison 4 in the mould closure position as shown in FIG. 5. On attainment of the mould closure position the force of the plate springs is overcome by the effect of the piston-cylinder-arrangement so that the gap given between the clamping members 16 and the seating surfaces 11 of the plunger 5 is completely closed in order to prevent the formation of a gap in the closed mould. The corners of the label 15 can be slightly rounded off whereby the label lies sunk in the hollow body.

The making of the necessary cuts transversely to the longitudinal axis of the hollow body must take place before the plunger 5 is moved out from its position shown in FIG. 2. In order to be able to make these transverse cuts before the making of the longitudinal cut by the plunger 5 in the film strip 8, there is arranged in the mould half 2 a cutting or stamping tool 23 which is moved upward by means of a lever 24 by any appropriate actuation member, when the film 8 is at rest in the mould 2. The spacing of the cutting tool 23 from the front edge of the plunger corresponds to one label length or a multiple of the label length. In order to be able to adjust the cutting tool 23 to the requisite length of the label 15, it is held on the mould half 2 so that it is transversely displaceable.

Figure 6:
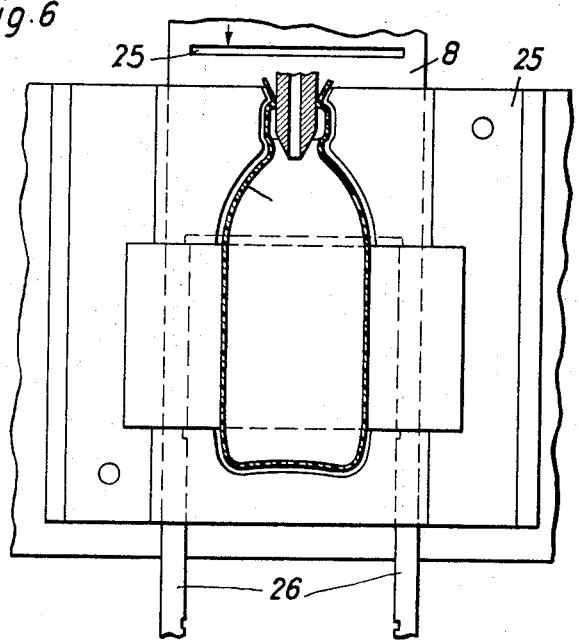
FIG. 6 is a schematic view with a film strip running in the longitudinal direction of the hollow body.
Figure 7:
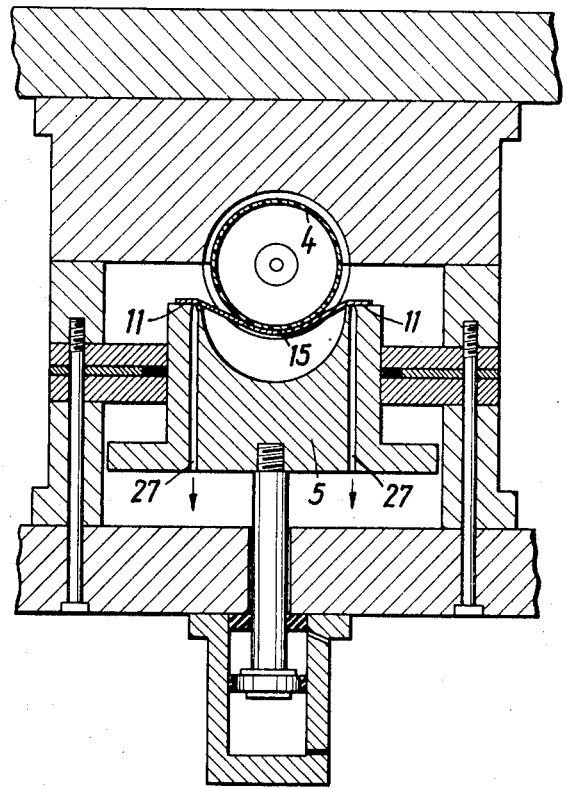
FIG. 7 is a view in accordance with FIG. 4 in which the perforations are arranged, as holding device, impinged on with vacuum intake air emptying in the seating surfaces of the plunger.

FIGS. 6 and 7 show an embodiment in which the film strip 8 is guided in the direction of the longitudinal axis of the hollow body 4 through the mould 2. For the sake of clarity the portions of the foil strip projecting above and below the mould are drawn in the plane of the drawing, where the transverse cut is shown in the form of a stamping 25. Instead of the cut-out 25 a simple cut can be carried out. The foil strip 8 is transported in the direciton of the arrow, the film strip 8 being drawn in and waste edges 26 leave the mould 1, 2 as shown.

Figure 8:
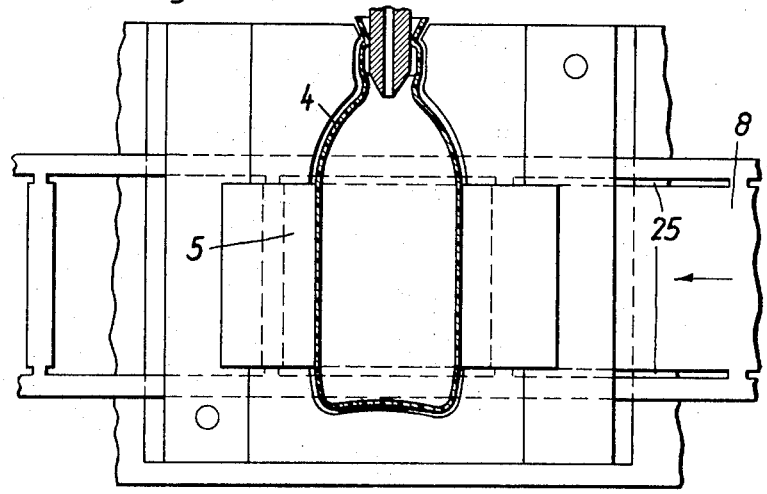
FIG. 8 is a schematic view in accordance with FIG. 6 with a film strip running at right angles to the longitudinal axis of the hollow body.

FIG. 8 shows an embodiment corresponding to FIG. 6 with the difference that the film strip 8, as in FIG. 1 is moved in the direction of the arrow perpendicularly to the longitudinal axis of the hollow body 4. In this case the cuts or stampings 25 to be made must first be undertaken on both sides along the edges of the film strip 8. The subsequent cuts in the direction of the longitudinal axis of the hollow body 4 are carried out according to FIGS. 2 to 5 by the plunger 5.

FIG. 7 shows a variant of the embodiment of FIGS. 2 to 5; here, instead of the clamping members 16, there are arranged in the plunger 5 passages 27 which open on to the seating surfaces 11. By using suction in the passages 27 the edge regions of the label 15 are held in position on the seating surfaces 11 of the plnnger 5. Here, too, the edge regions are withdrawn from the seating surfaces 11 on the mould closure movement of the plunger 5 and brought to rest against the hollow body 4.

Figure 9:
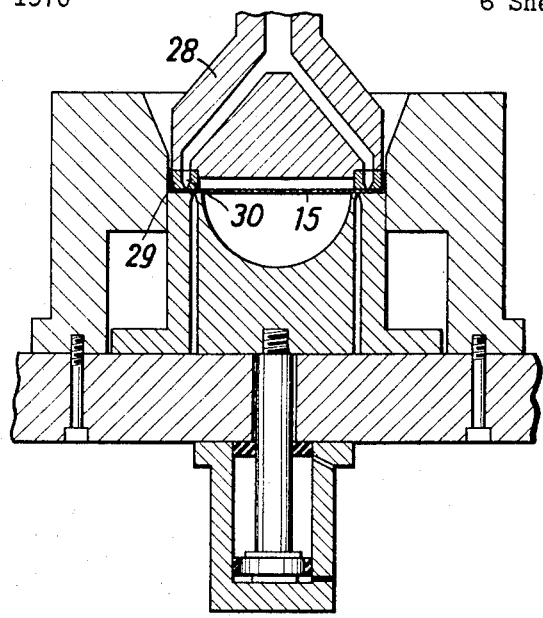
FIG. 9 is a view of an engagement device for inserting ready cut labels into the blow mould.
Figure 10:
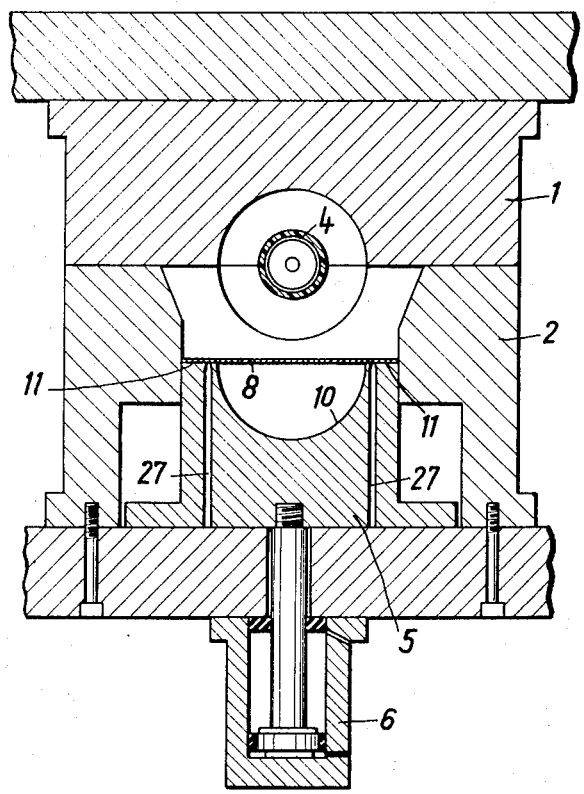
FIG. 10 is a view in accordance with FIG. 2 using ready cut labels.
Figure 12:
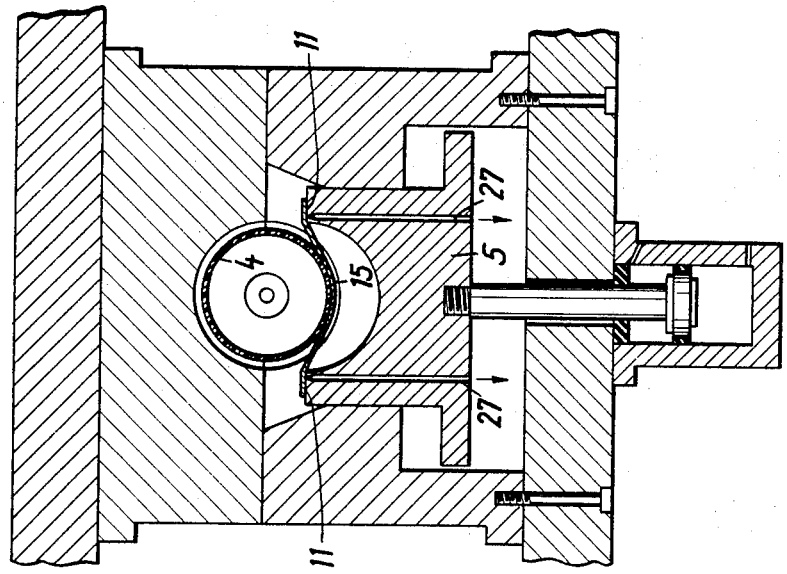
FIG. 12 is a view in accordance with FIG. 5 using ready cut labels.
Figure 11:
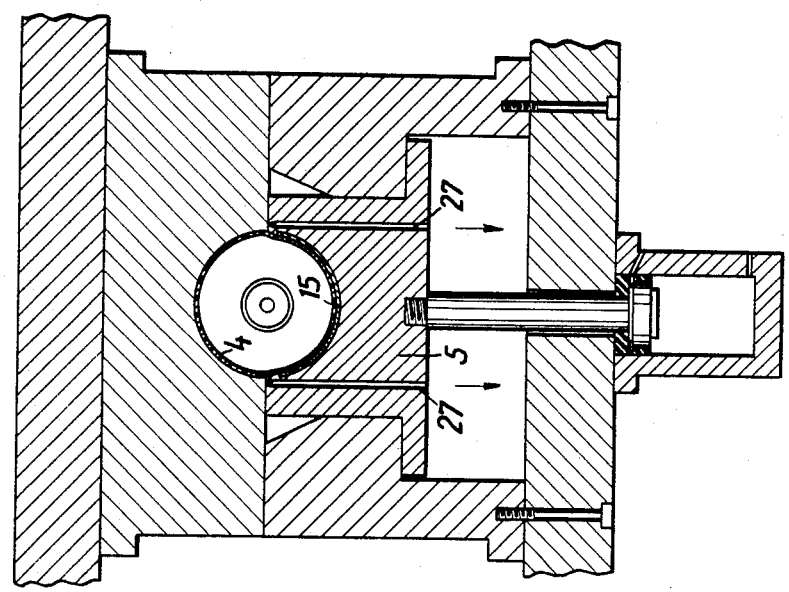
FIG. 11 is a view in accordance with FIG. 7 using ready cut labels.

FIGS. 9 to 12 show a device in accordance with the invention with a ready cut inserted label, FIG. 9 depicting an insertion device. As FIG. 9 shows, a ready cut label 15 is removed at its opposite edges by a gripping device 28 from a pile of labels (not shown). At both edges of the gripping device 28 are arranged elastic insert components 29 into which suction openings 30 open. The gripping device 28 is set down on the uppermost label of the stack, whereupon the label is engaged by the vacuum openings 30 at or near its edges. The gripping member 28 is then moved into the opened mould in such a manner that the elastic inserts 29 come into contact with the seating surfaces 11 of the plunger 5. After that the vacuum openings 30 are supplied with compressed air, by means of which the label 15 is lain in stretched position onto the surfaces 11 of the plunger 5. At the same time suction is applied to the bores 27 of the plunger 5 so that the label 15 is maintained in a taut or stretched position. FIGS. 10 to 12 show the mode of operation of the device with a ready cut label, where the application of the label onto the parison takes place in practically the same manner, as depicted in FIGS. 2 to 5.

I claim:
1. A method for blocw-moulding a hollow body of a thermoplastic synthetic resin material and applying thereto, as the body is blow-moulded, a label in the form of a piece of a thin film of material capable of adhering to said thermoplastic synthetic material, said method comprising the steps of:
  positioning a parison of said thermoplastic synthetic resin material in a mould ready for forming into said hollow body by blow-moulding;
  positioning a said label to be applied to said hollow body on a plunger having a generally planar face and a concavity therein presenting a concave face corresponding to a portion of the inner periphery of the mould;
  yieldably holding the edges of said label on said planar face and initially yieldably maintaining the label in a generally planar disposition and in a spanning relationship to said concavity with the central areas of the label disposed in spaced relationship to said concave face;
  positioning the plunger so that said concave face thereof is retracted outwardly of an inner wall of the mould, said inner wall presenting the remainder of the inner periphery of the mould;
  commencing blow-moulding of the parison of thermoplastic material;
  prior to completion of the blow-moulding of the parison, advancing said plunger toward said hollow body and toward a mould closing position in a direction generally perpendicularly of the plane of said label and bringing the central area of said label into contact with a corresponding area of the partly blow-moulded parison; and
  continuing said blow-moulding of the parison and continuing the advancement of the plunger while permitting gradual lateral movement of the edges of said label along said planar face until the concave face of the plunger is substantially flush with said inner wall of the mould whereby to wrap the label around the hollow body.

2. A method as set forth in claim 1 wherein said label is caused to embrace the body over an arc of between 60° and 180°.

3. A method as set forth in claim 1 wherein is included the step of disposing the edges of the label in parallelism with respect to an axis of the body.

4. A method as set forth in claim 1 wherein is included the step of venting air from between the label and the body through a parting line of the mould.

5. A method as set forth in claim 1 wherein is included the step of cutting the label from a strip which is wider than the label, cuts extending in one direction being made prior to the cuts extending in a perpendicular direction.

6. A method as set forth in claim 5 wherein the cuts extending in said perpendicular direction result from said advancement of the plunger.

References Cited
UNITED STATES PATENTS
3,674,391   7/1972   Welle ............ 425—326 B
3,657,405   4/1972   Langecker ........ 264—94

JAN H. SILBAUGH, Primary Examiner

U.S. Cl. X.R.
156—232, 261; 264—89, 90, 153, 278